United States Patent [19]

Hoffmann, Sr.

[11] Patent Number: 4,707,391

[45] Date of Patent: Nov. 17, 1987

[54] VEHICLE BODY SURFACE REPAIR PATCH ASSEMBLY

[75] Inventor: Dennis Hoffmann, Sr., Hoffman Estates, Ill.

[73] Assignee: Pro Patch Systems, Inc., Hoffman Estates, Ill.

[21] Appl. No.: 6,881

[22] Filed: Jan. 27, 1987

[51] Int. Cl.⁴ .......................................... B32B 35/00
[52] U.S. Cl. ..................... 428/63; 52/514; 156/94; 428/40; 428/255
[58] Field of Search ............ 428/31, 63, 40, 137, 428/255; 156/94; 52/514

[56] References Cited

U.S. PATENT DOCUMENTS

| | | | |
|---|---|---|---|
| 1,044,323 | 11/1912 | Wiggin | 428/151 |
| 1,669,541 | 5/1928 | Spreen | 428/63 X |
| 2,226,589 | 12/1940 | Smyers | 428/907 X |
| 2,486,669 | 11/1949 | Nassimbene | 428/63 X |
| 2,598,194 | 5/1952 | Shippey | 52/514 |
| 2,638,774 | 5/1953 | Wieman | 52/514 |
| 2,833,327 | 5/1958 | Boyce | 428/63 X |
| 2,997,416 | 8/1961 | Helton | 52/514 X |
| 3,049,836 | 8/1962 | Weissman | 428/63 X |
| 3,109,765 | 11/1963 | Petrowsky | 428/63 |
| 3,189,509 | 6/1965 | Needham | 428/63 |
| 3,205,972 | 9/1965 | Stricker et al. | 428/78 X |
| 3,325,955 | 6/1967 | Havt | 52/514 |
| 3,470,048 | 9/1969 | Jones | 428/63 X |
| 3,690,084 | 9/1972 | Leblanc | 52/514 |
| 3,850,718 | 11/1974 | Trapani | 156/94 |
| 3,866,376 | 2/1975 | Nelson | 428/538 X |
| 4,135,017 | 1/1979 | Hoffmann, Sr. | 428/63 X |
| 4,378,403 | 3/1983 | Kotcharian | 428/251 |

FOREIGN PATENT DOCUMENTS 1098104  1/1968  United Kingdom .................. 156/94

*Primary Examiner*—Henry F. Epstein
*Attorney, Agent, or Firm*—Robert M. Ward

[57] ABSTRACT

The improved vehicle body surface repair patch assembly of the present invention is suitable for use in conjunction with a vehicle body surface repair compound, and includes a thin and relatively rigid plate which may be of metal or plastic and which is perforated to receive in such perforations the vehicle body surface repair compound to provide substantial thickness and accordingly enhanced strength to the repair patch. Adhesive coating means are disposed on the back surface of the perforated sheet, and mesh means preferably formed of fiberglass mesh are secured to the front surface of the perforated plate to receive, to support and to hold the vehicle body surface repair compound, thereby to provide a matchingly contoured surface with that of the vehicle body surface to be repaired.

16 Claims, 3 Drawing Figures

VEHICLE BODY SURFACE REPAIR PATCH ASSEMBLY

BACKGROUND OF THE INVENTION

The present invention is directed in general to the vehicle body repair arts, and more particularly to an improved vehicle body surface repair patch assembly providing considerable thickness to the repair patch and ease of bending such patch to match the contours of the surface to be repaired.

Prior art devices for vehicle body repair have generally been of the type disposable on the interior surface of the vehicle metal body to be repaired, and have functioned to serve as backing plates for body filler or fiberglass compounds. These prior art backing-type plate devices have in general functioned adequately for their backing and holding purpose for filler or fiberglass compounds. However, such prior art devices have in general also been unduly complicated in structure and accordingly expensive to produce and relatively complicated to use.

Also, such backing-type plates have been difficult to bend into a contour matching that of the vehicle body surface to be repaired, and especially because of their placement on the back surface of the vehicle body to be repaired. Moreover, the prevalence of dirt, grease and grime on the back of such body surfaces has rendered adhesion thereto somewhat problematical in many such prior art devices.

Various other prior art patch systems have been proposed, but have included surfaces with no means available therein for permitting penetration therethrough by the vehicle body repair compound, fiberglass compound, Bondo ® or other materials which when cured will form the repaired surface.

Yet other prior art vehicle repair devices have been difficult if not impossible to trim to a particular size, and accordingly have resulted in wasting materials, which has resulted in additional expense.

Accordingly, in view of the defects and deficiencies of prior art vehicle body repair patch apparatus, it is the material object of the improved vehicle body surface repair patch assembly of the present invention to materially alleviate such deficiencies and difficulties.

It is a further object of the improved vehicle body surface repair patch assembly of the present invention to provide a relatively inexpensive vehicle body repair system which is relatively uncomplicated, which may be utilized by those of less than professional skill in the vehicle body repair arts, and at a reasonable cost.

It is a yet further object of the improved vehicle body surface repair patch assembly of the present invention to provide a patch which is easily and flexibly adapted to a wide variety of contours and types of surfaces on such vehicle bodies to be repaired.

It is a material object of the improved vehicle body surface repair patch assembly of the present invention to solve the prior art problem of trimming to a particular size.

These and other objects of the improved vehicle body surface repair patch assembly of the present invention will become apparent to those of ordinary skill in the art upon a review of the disclosure as set forth hereinbelow.

SUMMARY OF THE INVENTION

The improved vehicle body surface repair patch assembly of the present invention is suitable for use in conjunction with a vehicle body surface repair compound, and includes a thin and relatively rigid metallic or plastic plate which is perforated, and to receive in such perforations the vehicle body surface repair compound to provide substantial thickness and accordingly enhanced strength to the repair patch.

Adhesive coating means are disposed on the back surface of the perforated plate, and fiber glass mesh means are secured to the front surface of the perforated plate to receive support and to hold the vehicle body surface repair compound to provide a matchingly contoured surface with that of the vehicle body surface to be repaired.

The improved vehicle body surface repair patch assembly of the present invention will be better understood by those of ordinary skill in the art upon a review of the following brief description of the drawing, detailed description of preferred embodiments, appended claims and accompanying drawing.

DETAILED DESCRIPTION OF PREFERRED EMBODIMENTS

Figure 1:
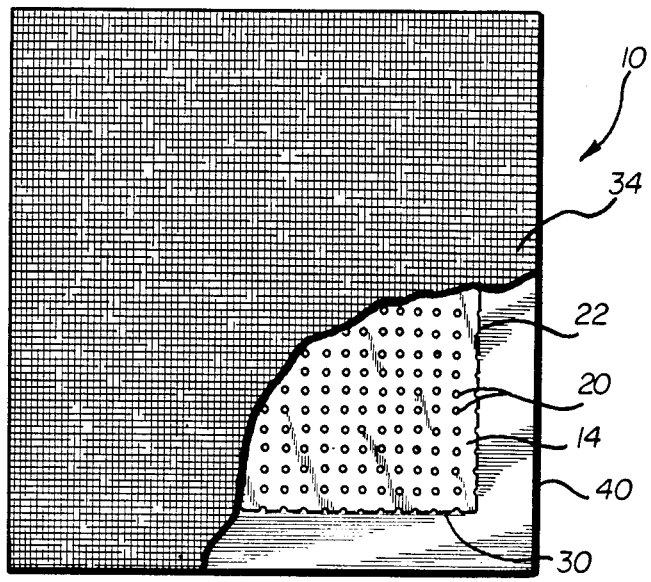
FIG. 1 is a perspective view of the improved vehicle body surface repair patch assembly of the present invention including a thin perforated plate having an adhesive disposed on the inner surface thereof and having fiberglass means disposed on the front surface thereof shown partially peeled away and a release paper disposed on the opposite side thereof.

The improved vehicle body surface repair patch assembly of the present invention is suitable for use in conjunction with a vehicle body surface repair compound. Examples of such compounds include Bondo ®, various fiberglass compounds, body filler, metallic powders bonded with epoxy and other resin binder systems. (Bondo ® is a registered trademark of Dynatron/Bondo Corporation; of Atlanta, Ga.) The vehicle repair path assembly of the present invention includes a thin and relatively rigid metallic, plastic or other suitable, preferably perforated plate. Such suitable perforated plates are further sufficiently bendable for disposing such metallic plate in matching contoured relationship to the contours of the vehicle body surface to be repaired. The perforated plate hereof contains a plurality of perforations therein for receiving supporting, and holding a vehicle surface body repair compound. Such perforated plate has a first, or rear side with a central surface thereon for covering the vehicle body surface to be repaired, and in some instances to cover a hole in such vehicle body surface. A periphery on such first or rear side of the perforated plate is for disposition into intimate proximity with the vehicle body surface to be repaired, and such perforated plate is bordered by edge portions.

Adhesive coating means are disposed on the first or rear side of the perforated plate and on at least a substantial portion of the periphery thereof. Such adhesive functions to firmly bond the periphery of the perforated plate into intimate proximity and substantially fixed disposition on the vehicle body surface to be repaired.

Fiberglass mesh means are secured at the interior surface thereof to the second, or top side of the perforated plate. Such fiberglass mesh functions to receive support and hold the vehicle body surface repair compound within the interstices of such fiberglass mesh to dispose the fiberglass mesh into substantially matching contoured relationship to the vehicle body surface to be prepared. Although fiberglass mesh is utilized in preferred embodiments, other mesh components which will function to hold vehicle body surface repair compound during application thereof, and stabilization thereof after the curing thereof maybe utilized in alternative embodiments.

The improved vehicle body surface repair patch assembly of the present invention further preferably comprises a release coated sheet which removably covers at least the adhesive disposed on first or rear side of the perforated plate. In such embodiments the release coated sheet preferably comprises was paper, although in alternative embodiments other release coated papers or other sheeting may be utilized, such as Teflon, etc.

The vehicle body surface repair compound used in preferred embodiments of the vehicle body repair patch assembly of the present invention is disposed on the second or top surface of the perforated plate. The vehicle body surface repair compound penetrates the perforations in the perforated plate to flow therethrough and to provide substantial thickness, and accordingly enhanced strength, to the repair patch when the repair patch is cured.

The fiberglass utilized in preferred embodiments of the patch structure of the present invention may in some preferred embodiments extend over the lateral edges of the perforated plate to cover such lateral edges and to provide an enhanced smoothness of transition between the patch structure and the original structure of the vehicle body surrounding the area which has been repaired by the patch structure of the present invention.

A release coating sheet structure may also be utilized for removably covering, in addition to the adhesive on the periphery of the perforated plate, the rear surface of the fiberglass mesh means which extend beyond the lateral edges of the perforated plate.

The metallic plate element may preferably comprise aluminum sheeting, although other metallic or plastic sheeting, such as polymeric sheeting, may be utilized. Such sheeting may preferably be of a 0.012 gauge. In any event, the perforated plate utilized in preferred embodiments must be trimable to the selected shape, preferably by means of scissors.

In preferred embodiments of the improved vehicle body surface repair patch assembly of the present invention the adhesive which is disposed on the first or rear surface of the perforated plate may preferably be a pressure sensitive adhesive.

The fiberglass mesh utilized in preferred embodiments of the patch assembly invention hereof is secured at the internal surface thereof, preferably by adhesive means to the second or top side of the metallic or other plate. Such adhesive means for securing such fiberglass mesh may also preferably be a pressure sensitive adhesive.

Additionally, in other preferred embodiments of the repair patch assembly invention hereof, a release coated sheet may also be removably disposed over the top surface of the fiberglass mesh to protect the top surface of the patch.

Figure 2:
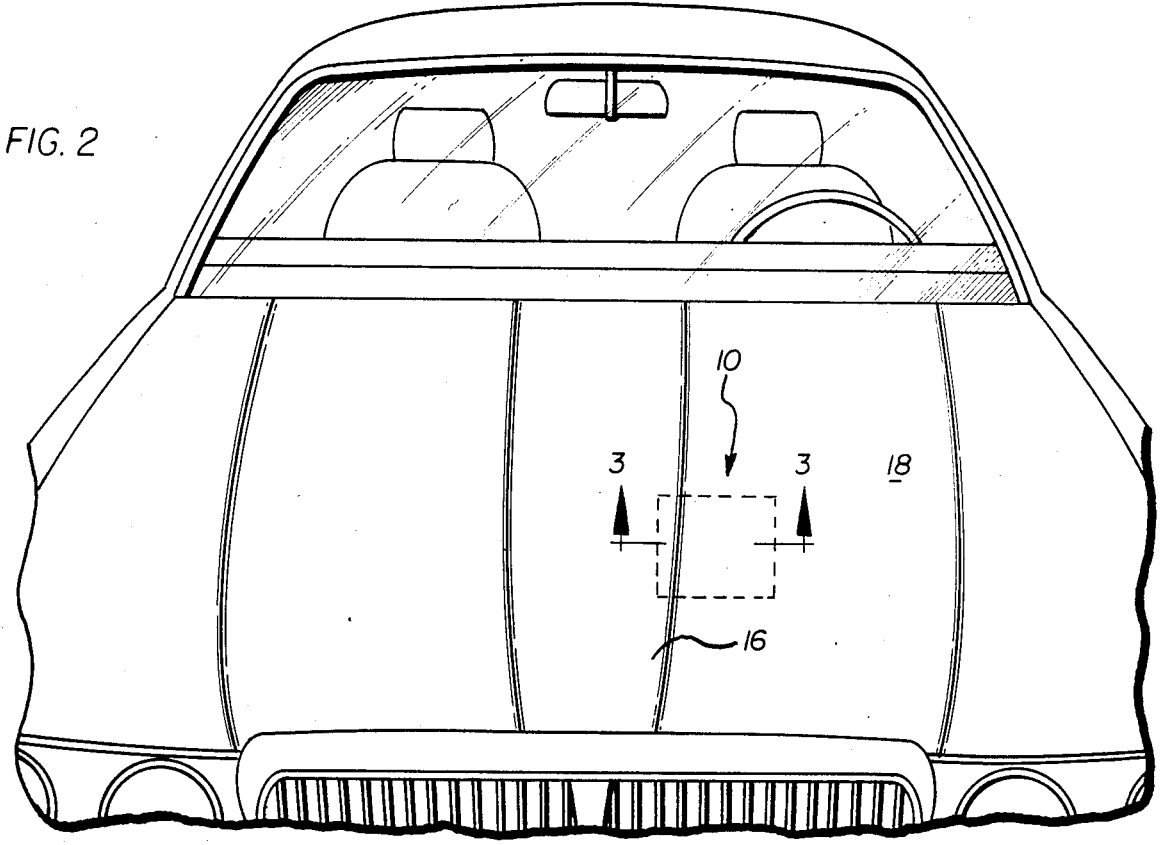
FIG. 2 is a perspective view of a section of the vehicle body surface to be repaired shown in phantom lines the improved vehicle body surface repair patch assembly of the present invention disposed thereon in matching contour to such vehicle body to be repaired and covering and repairing a hole therein.
Figure 3:
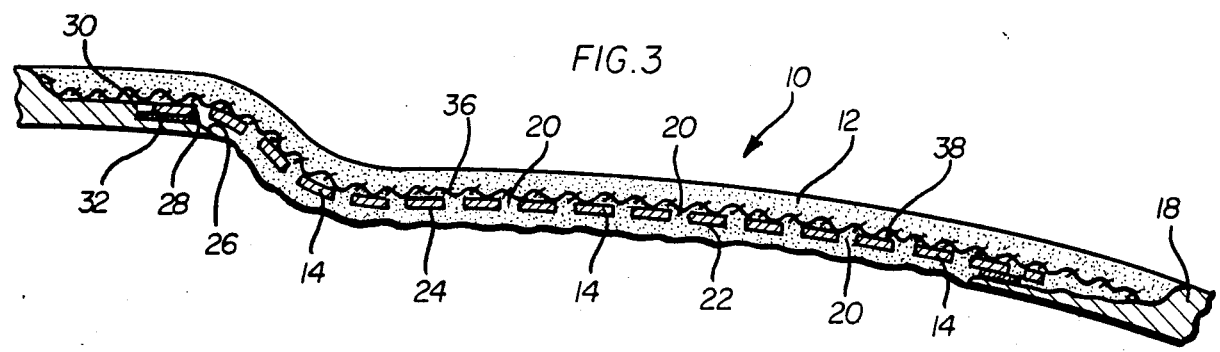
FIG. 3 is an enlarged cross-sectional view taken along line 3—3 of FIG. 2, and showing the improved vehicle body surface repair patch assembly of the present invention applied to the exterior surface of a vehicle body surface to be repaired, and including a thin perforated plate disposed over the hole in the vehicle body surface to be repaired, and adhesive disposed on the back surface at least at the periphery of the thin perforated plate for firmly bonding such plate to the vehicle body surface to be repaired, a fiberglass mesh means disposed on the top surface of the perforated plate for receiving, supporting and holding a vehicle body surface repair compound therein to dispose the fiberglass mesh means in substantially matching contoured relationship to the vehicle body surface to be repaired, and such perforations in the thin plate for receiving the vehicle body repair compound therewithin to substantially increase the thickness and accordingly the strength upon cure of such vehicle body compound of the patch assembly of the present invention.

Referring now to the drawing and to FIGS. 1-3 in particular, the improved vehicle body surface repair patch assembly of the present invention designated as generally 10 is suitable for use in conjunction with a vehicle body surface repair compound 12 as shown in FIG. 3. Examples of such compounds include Bondo ®, various fiberglass compounds, body filler, metallic powders bonded with epoxy and other resin binder systems.

The vehicle repair patch assembly 10 of the present invention includes a thin and relatively rigid perforated plate 14. Such suitable perforated plate 14 is further sufficiently bendable for disposing such plate 14 into matching contoured relationship to the contours 16 of the vehicle body surface 18 to be repaired, as shown in FIGS. 2 and 3. Plate 14 hereof contains a plurality of perforations 20 therein for receiving, supporting, and holding such vehicle surface body repair compound 12. Such plate 14 has a first, or rear side 22 with a central surface 24 thereon for covering the vehicle body surface 18 to be repaired, and in some instances a hole 26 in such vehicle body surface 18. A periphery 28 on the rear side 22 of the metallic plate is for disposition into intimate proximity with the vehicle body surface 18 to be repaired, and such plate 14 is bordered by edge portions 30.

Adhesive coating means 32 are disposed on rear side of plate 14 and on at least a substantial portion of periphery 28 thereof. Such adhesive 32 functions to firmly bond periphery 28 of plate 14 into intimate proximity and substantially fixed disposition on vehicle body surface 18 to be repaired.

Fiberglass mesh means 34 are secured at the interior surface 36 thereto to the second, or top side 38 of plate 14. Such fiberglass mesh 34 functions to receive support and hold vehicle body surface repair compound 12 within the interstices of such fiberglass mesh 34 to dispose the fiberglass mesh 34 into substantially matching contoured relationship to the vehicle body surface 18 to be repaired. Fiberglass mesh 34 is utilized in preferred embodiments, but other mesh components which will function to hold vehicle body surface repair compound 12 during application thereof, and will provide support and stabilization after the curing thereof, may be utilized.

The improved vehicle body surface repair patch assembly 10 of the present invention further preferably comprises a release coated sheet 40 which removably covers at least the adhesive 32 disposed on first or rear side 22 of plate 14. In such embodiments, the release coated sheet 40 preferably comprises wax paper, although in alternative embodiments other release coated papers or other sheeting may be utilized, such as Teflon, etc.

Vehicle body surface repair compound 12 used in preferred embodiments of the vehicle body repair patch assembly 10 of the present invention is disposed on the second or top surface 38 of plate 14. Vehicle body surface repair compound 12 penetrates perforations 20 in plate 14 to flow therethrough and to provide substantial thickness and accordingly enhanced strength to the repair patch 10 when the repair patch is cured, as shown particularly in FIG. 3.

The fiberglass 34 utilized in preferrd embodiments of the patch structure 10 of the present invention may in some preferred embodiments extend over the lateral edges 30 of plate 14 to cover such edges 30 and to provide an enhanced smoothness of transition between the patch structure 10 and the original structure of the vehicle body 18 surrounding the area which has been repaired by the patch structure 10 of the present invention, as shown in FIGS. 2 and 3.

Of course, a release coating sheet structure may also be utilized for also removably covering fiberglass mesh means 34 which extends beyond the lateral edges 30 of plate 14, as shown in FIG. 1.

Patch 10 may be constructed in preferred embodiments by beginning with a 300' roll of fiberglass mesh 34. Mesh 34 is cut to 5" wide, and a four foot amount is unrolled. Plate 14, which has been sent through a coater and coated on one side with adhesive 32, is placed on mesh 34. Plate 14 is 4"×4" in one preferred embodiment. When plates 14 are placed one inch apart therearound, preferably each patch 10 has a half inch border. Next, a piece of 5"×5" waxed paper release coating is placed over adhesive 32 area. The resultant 4' long strip of separate patches 10 is then cut every 5" to make individual patches 10.

It is important in preferred embodiments that at least a half inch of fiberglass mesh 34 surround plate 14. Such half inch border acts as a natural feathering agent, which makes the repair easier for the amateur to coat over the repaired area. Each size patch preferably has approximately a half inch area around it, and such patch 10 may come in convenient sizes, including 2"×2", 4"×4" and 6"×6", as well as other shapes and sizes.

Plate 14 may in some embodiments comprise 0.012 gauge metal, with 5/64 inch round holes, and 60 degree staggered centers. The adhesive may be a pressure sensitive adhesive such as National brand No. 33-4034. The mesh may be of the kind produced by Metallized Products, Fla. The release coated sheets 40, 42 may comprise household waxed paper such as that produced by Kitchen Charm or Daubert Coated Products or silicone treated paper 1-40 BK6-169.

The basic and novel characteristics of the improved apparatus of the present invention will be readily understood from the foregoing disclosure by those skilled in the art. It will become readily apparent that various changes and modifications may be made in the form, construction and arrangement of the improved apparatus of the present invention as set forth herein above without departing from the spirit and scope of the invention. Accordingly, the preferred and alternative embodiments of the present invention set forth hereinabove are not intended to limit such spirit and scope in any way.

What is claimed is:

1. An improved vehicle body surface repair patch assembly suitable for use in conjunction with a vehicle body surface repair compound, said vehicle repair patch assembly comprising:

a thin, relatively rigid, flexible and deformable plate which is sufficiently bendable for matching the contours of the vehicle body surface to be repaired, said plate containing a plurality of perforations therein for receiving, supporting and holding a vehicle surface body repair compound and having a first side with a central surface thereon for covering the vehicle body surface to be repaired, a periphery for disposition into intimate proximity with the vehicle body surface, and bordered by edge portions, said plate having a second side opposing the first side;

adhesive coating means disposed on the first side of said plate and on at least a substantial portion of the periphery thereof for firmly bonding the periphery in intimate proximity to the vehicle body surface to be repaired; and mesh means secured at the interior surface thereof to the second side of said plate for receiving, supporting and holding a vehicle body surface repair compound therein to dispose said mesh means in substantially matching contoured relationship to the vehicle body surface to be repaired.

2. The improved vehicle body surface repair patch of claim 1 further comprising a release coated sheet removably covering at least said adhesive disposed on the first side of said plate.

3. The improved vehicle body surface repair patch of claim 2 wherein said release coated sheet comprises waxed paper.

4. The improved vehicle body surface repair patch of claim 1 wherein said vehicle body surface repair compound is disposed upon the second surface of said plate and penetrates said perforations therein to flow therethrough to provide substantial thickness and accordingly enhanced strength to the repair patch upon curing of the penetrated vehicle body surface repair compound.

5. The improved vehicle body surface repair patch of claim 1 wherein said mesh means extends over the lateral edges of said plate.

6. The improved vehicle body surface repair patch of claim 5 further comprising a release coated sheet removably covering the rear surface of said mesh means which extend beyond the lateral edge of said plate.

7. The improved vehicle body surface repair patch of claim 1 wherein said plate comprises a metallic plate.

8. The improved vehicle body surface repair patch of claim 1 wherein said adhesive disposed on said first surface of said plate is a pressure sensitive adhesive.

9. The improved vehicle body surface repair patch of claim 1 wherein said mesh means is secured at the internal surface thereof by adhesive means to said second side of said plate.

10. The improved vehicle body surface repair patch of claim 9 wherein said adhesive means comprises a pressure sensitive adhesive.

11. The improved vehicle body surface repair patch of claim 1 further comprising a release coated sheet removably disposed over said mesh means to cover the surface thereof.

12. The improved vehicle body surface repair patch of claim 7 wherein said metallic plate comprises aluminum.

13. The improved vehicle body surface repair patch of claim 12 wherein said aluminum metallic plate is approximately 0.012 gauge.

14. The improved vehicle body surface repair patch of claim 1 wherein said plate is trimable to a selected shape by means of scissors.

15. The improved vehicle body surface repair patch of claim 1 wherein said mesh means comprises fiberglass mesh.

16. The improved vehicle body surface repair patch of claim 1 wherein said plate comprises polymeric sheeting.

* * * * *